(12) United States Patent
Shi et al.

(10) Patent No.: US 10,977,533 B2
(45) Date of Patent: Apr. 13, 2021

(54) VEHICLE WINDSHIELD WITH TWO-DIMENSIONAL CODE AND MANUFACTURING PROCESS THEREOF

(71) Applicant: SAINT-GOBAIN GLASS FRANCE, Courbevoie (FR)

(72) Inventors: Ce Shi, Shanghai (CN); Huanhuan Wu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/636,507

(22) PCT Filed: Dec. 25, 2018

(86) PCT No.: PCT/CN2018/123397
§ 371 (c)(1),
(2) Date: Feb. 4, 2020

(87) PCT Pub. No.: WO2019/128970
PCT Pub. Date: Jul. 4, 2019

(65) Prior Publication Data
US 2020/0257948 A1    Aug. 13, 2020

(30) Foreign Application Priority Data
Dec. 29, 2017 (CN) .......................... 201711472190.7

(51) Int. Cl.
*G06K 19/06* (2006.01)
*B32B 17/10* (2006.01)
(Continued)

(52) U.S. Cl.
CPC .. *G06K 19/06037* (2013.01); *B32B 17/10036* (2013.01); *B32B 17/10266* (2013.01);
(Continued)

(58) Field of Classification Search
None
See application file for complete search history.

(56) References Cited

U.S. PATENT DOCUMENTS 5,565,237 A     10/1996  Bartetzko
2010/0295330 A1 * 11/2010  Ferreira ............ B32B 17/10174
                                                        296/84.1

FOREIGN PATENT DOCUMENTS

CN    101290145 A    10/2008
CN    201456988 U     5/2010
(Continued)

OTHER PUBLICATIONS

International Search Report as issued in International Patent Application No. PCT/CN2018/123397, dated Feb. 15, 2019.

*Primary Examiner* — Kristy A Haupt
(74) *Attorney, Agent, or Firm* — Pillsbury Winthrop Shaw Pittman LLP

(57) ABSTRACT

A vehicle windshield with a two-dimensional code includes a first glass, a second glass and an intermediate film provided between the first glass and the second glass. The first glass includes a first surface facing the exterior of a vehicle and a second surface adhered to the intermediate film, while the second glass includes a third surface adhered to the intermediate film and a fourth surface facing the interior of the vehicle. Black enamel paint is printed on the second surface and/or the fourth surface. The second surface or the fourth surface is provided with a two-dimensional code printed with enamel paint at a position corresponding to the black enamel paint. The two-dimensional code contains unique information of the glass and/or the vehicle.

13 Claims, 2 Drawing Sheets

(51) Int. Cl.
*B32B 37/18* (2006.01)
*B32B 38/00* (2006.01)
*B60J 1/02* (2006.01)
*C03B 23/023* (2006.01)
*C03C 17/02* (2006.01)
*C03C 17/10* (2006.01)
*G06K 1/12* (2006.01)

(52) U.S. Cl.
CPC .. *B32B 17/10935* (2013.01); *B32B 17/10981* (2013.01); *B32B 37/182* (2013.01); *B32B 38/145* (2013.01); *B60J 1/02* (2013.01); *C03B 23/023* (2013.01); *C03C 17/02* (2013.01); *C03C 17/10* (2013.01); *G06K 1/121* (2013.01); *B32B 2250/03* (2013.01); *B32B 2250/40* (2013.01); *B32B 2255/20* (2013.01); *B32B 2255/205* (2013.01); *B32B 2307/4023* (2013.01); *B32B 2307/412* (2013.01); *B32B 2311/08* (2013.01); *B32B 2315/08* (2013.01); *B32B 2605/006* (2013.01); *B32B 2605/08* (2013.01); *C03C 2217/256* (2013.01); *C03C 2218/119* (2013.01)

(56) References Cited

FOREIGN PATENT DOCUMENTS

| | | | |
|---|---|---|---|
| CN | 102407753 A | 4/2012 | |
| EP | 2664503 A1 * | 11/2013 | ............... H05B 3/86 |
| JP | 2004-043212 A | 2/2004 | |
| WO | WO 2017/187054 A1 | 11/2017 | |

* cited by examiner

VEHICLE WINDSHIELD WITH TWO-DIMENSIONAL CODE AND MANUFACTURING PROCESS THEREOF

CROSS-REFERENCE TO RELATED APPLICATIONS

This application is the U.S. National Stage of PCT/CN2018/123397, filed Dec. 25, 2018, which in turn claims priority to Chinese patent application number 201711472190.7 filed Dec. 29, 2017. The content of these applications are incorporated herein by reference in their entireties.

RELATED FIELD

The present disclosure generally relates to the field of glass processing. More specifically, it relates to a vehicle windshield with a two-dimensional code and a manufacturing process thereof.

BACKGROUND

Various glass products have been widely applied in various industries. In the automotive industry, laminated glass is especially used as a front windshield to improve passenger safety so as to prevent the glass from being broken and hurting passengers in the event of an accident. In addition, it has energy absorption performance and shock absorption performance. The laminated glass, also known as plyglass, is an integral composite glass product consisting of two pieces of glasses and one or more layers of organic polymer intermediate film sandwiched therebetween, which can be permanently adhered after being treated by a special high-temperature and pre-pressing (or vacuuming) process in combination with a high-temperature and high-pressure process. Common intermediate film for laminated glass is PVB (polyvinyl butyral).

In order to realize the purpose of anti-counterfeiting and origin identification, a corner of a vehicle windshield is usually printed or sandblasted with information such as manufacturer's label, manufacturer's mark, quality certification mark and so on. However, it is difficult to mark more information on a large area in this manner. Especially for the current process, content printed on the glass from a batch can only be exactly the same, so that each piece of glass can not correspond to a unique mark. By adopting radio frequency identification (RFID) chip lamination technology, the anti-counterfeiting function and the storage of more information can be effectively achieved. However, it requires additional components, thus being expensive. With the development and popularization of mobile communication technology, it has become a development trend to apply two-dimensional codes including more digital information to the registration and verification of information about the vehicle windshields.

SUMMARY

The object of the present disclosure is to solve the above problems in the prior art, and a vehicle windshield with a two-dimensional code is provided. The two-dimensional code recording unique information of the glass and/or the vehicle can be made visible or invisible to the naked eyes according to actual requirements, thus effectively achieving the anti-counterfeiting function without aesthetically affecting the appearance of the vehicle windshield.

To this end, according to one aspect of the present disclosure, a vehicle windshield with a two-dimensional code is provided. The vehicle windshield comprises a first glass, a second glass and an intermediate film provided between the first glass and the second glass. The first glass comprises a first surface facing the exterior of a vehicle and a second surface adhered to the intermediate film, while the second glass comprises a third surface adhered to the intermediate film and a fourth surface facing the interior of the vehicle. Black enamel paint is printed on the second surface and/or the fourth surface. Also, the second surface or the fourth surface is provided with a two-dimensional code printed with enamel paint at a position corresponding to the black enamel paint. The two-dimensional code contains unique information of the glass and/or the vehicle.

According to the above technical concepts, the present disclosure may further comprise any one or more of the following preferred embodiments.

In some preferred embodiments, the enamel paint comprises black enamel paint or silver paste.

In some preferred embodiments, the black enamel on the second surface and/or the fourth surface has different gloss from the enamel paint for printing the two-dimensional code.

In some preferred embodiments, the two-dimensional codes printed in different vehicle windshields are different.

According to another aspect of the present disclosure, a process for manufacturing a vehicle windshield with a two-dimensional code is provided. The vehicle windshield comprises a first glass, a second glass and an intermediate film provided between the first glass and the second glass. The first glass comprises a first surface facing the exterior of a vehicle and a second surface adhered to the intermediate film, while the second glass comprises a third surface adhered to the intermediate film and a fourth surface facing the interior of the vehicle. The process comprises the following steps:

a. providing a first glass and a second glass which are cut and shaped;
b. printing black enamel paint on the second surface and/or the fourth surface;
c. printing a two-dimensional code with enamel paint on the second surface or the fourth surface at a position corresponding to the black enamel paint, the two-dimensional code contains unique information of the glass and/or the vehicle;
d. molding the first glass and the second glass in a thermal-bending furnace; and
e. sandwiching an intermediate film between the first glass and the second glass which are thermal-bended and molded to obtain a finished product.

In some preferred embodiments, the enamel paint comprises black enamel paint or silver paste.

In some preferred embodiments, the black enamel paint on the second surface and/or the fourth surface has different gloss from the enamel paint for printing the two-dimensional code.

In some preferred embodiments, prior to the step d, a step of pre-sintering the first glass and/or the second glass is further comprised.

In some preferred embodiments, in step c, different two-dimensional codes are printed for different vehicle windshields.

By adopting the vehicle windshield with the two-dimensional code of the present disclosure, the appearance effect of the two-dimensional code can be realized as visible or invisible to the naked eyes according to the actual requirements. Also, different two-dimensional codes can be printed for different vehicle windshields. By interacting with intelligent identification devices (such as mobile phones), the two-dimensional code can realize not only anti-counterfeiting and authentication of unique information about the glass and/or the vehicle, but also other applications, including but not limited to: product tracing, quality control, network inquiry, and electronic payment, etc. In addition, such solution can avoid the identification error of two-dimensional code identification scanners due to light reflection characteristic of the glass material itself.

BRIEF DESCRIPTION OF THE DRAWINGS

Other features and advantages of the present disclosure will be better understood from the following preferred embodiments described in detail with reference to the accompany drawings, in which.

DETAILED DESCRIPTION OF THE INVENTION

The implementation and usage of the embodiments will be discussed in detail below. However, it should be understood that the specific embodiments discussed herein are merely illustrative of specific ways to implement and use the present disclosure without limiting the scope of the present disclosure. "Outer" and "inner" used hereinafter are directions with respect to the vehicle body. "Outer" refers to a direction away from the vehicle body, and "inner" refers to a direction facing the vehicle body.

Figure 1:
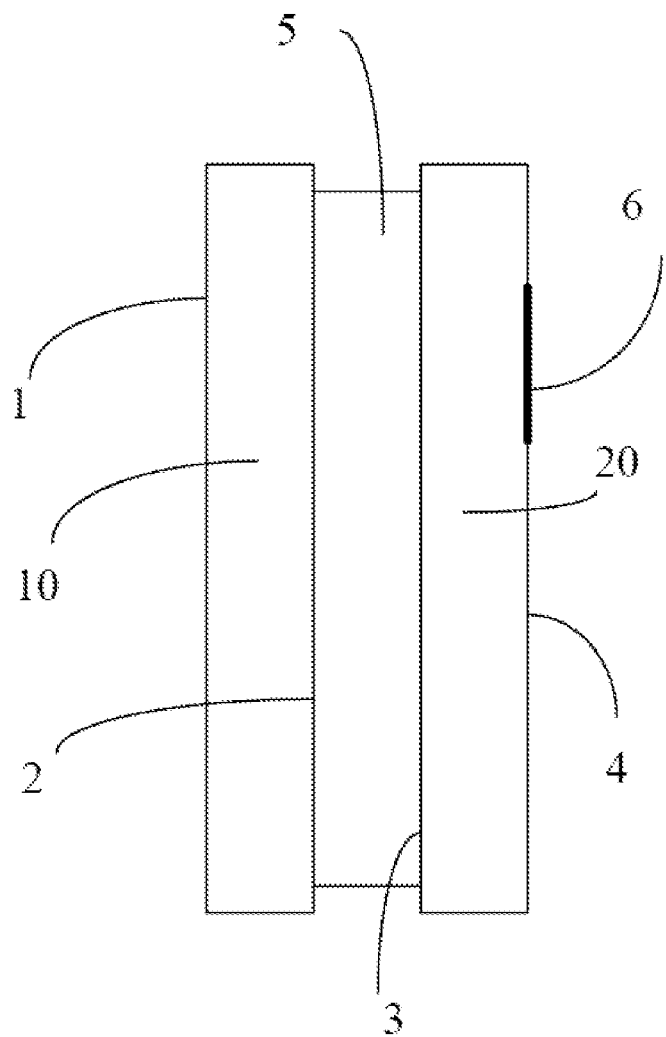
FIG. 1 is a schematic view of a vehicle windshield according to a preferred embodiment of the present disclosure, in which the two-dimensional code is formed on the fourth surface of the second glass.
Figure 2:
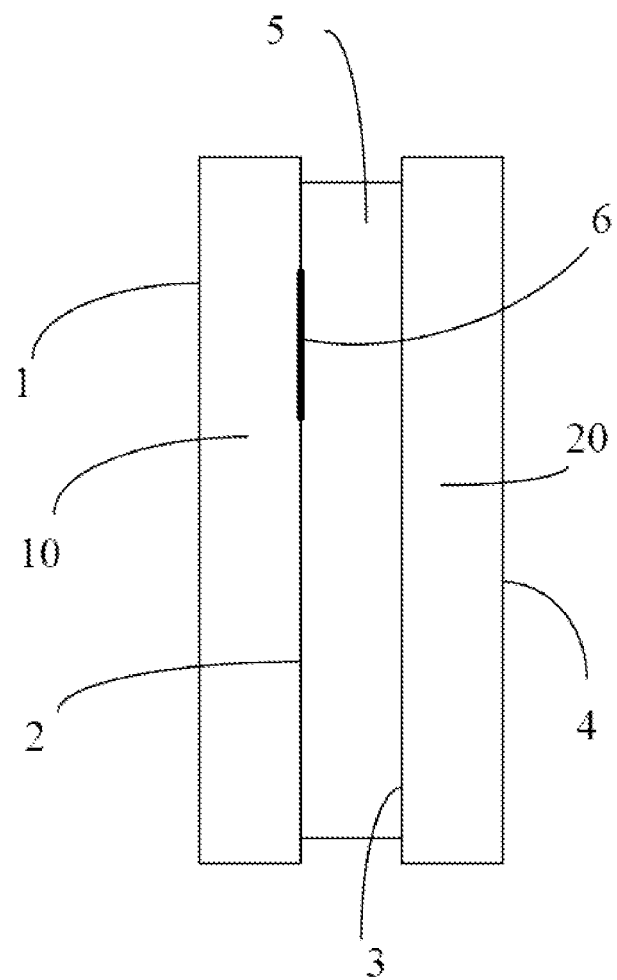
FIG. 2 is a schematic view of a vehicle windshield according to another preferred embodiment of the present disclosure, in which the two-dimensional code is formed on the second surface of the first glass.

Herein, "enamel paint", also known as enamel, is made by grinding varnish acting as a base material with addition of pigments and auxiliary agents, etc. The paint film formed after applying the enamel paint is hard, flat and smooth, and has a similar appearance to enameled colored paint. There are mainly two types of enamel: phenolic aldehyde enamel and alkyd enamel, which have good gloss, weather resistance, water resistance, strong adhesion, and can withstand strong change of climate. When applied to a vehicle windshield (especially a front windshield), enamel paint is also referred to as window ink. It mainly includes glass powder and pigment (mostly black), and includes a small amount of organic solvent as a dispersing agent. The enamel paint is typically used to be printed on the windshields to form black printed borders, such as printed patterns and trademarks, and provide the protection against sunlight or ultraviolet light. "Vehicle windshield" refers to a laminated glass including a first glass, a second glass and an intermediate film provided between the first glass and the second glass. As shown in FIGS. 1 and 2, the first glass 10 may be referred to as an outer glass which has a first surface 1 facing the exterior of the vehicle and a second surface 2 adhered to the intermediate film 5. The second glass 20 may be referred to as an inner glass which has a third surface 3 adhered to the intermediate film 5 and a fourth surface 4 facing the interior of the vehicle.

According to the concept of the present disclosure, black enamel paint is printed on the second surface 2 and/or the fourth surface 4 to form a black printed border, and a two-dimensional code 6 is printed with enamel paint on the second surface 2 or the fourth surface 4 at a position corresponding to the black enamel paint. The two-dimensional code contains unique information of the glass and/or the vehicle. For example, the information about the glass may include information such as manufacturer, manufacturer's mark, manufacturing date, type of glass, and quality certification mark, etc. The information about the vehicle may include vehicle identity information such as vehicle brand mark, etc.

Hereinafter, a vehicle windshield with a two-dimensional code and a manufacturing process thereof according to the present disclosure will be specifically described with reference to the embodiments.

Referring to an embodiment shown in FIG. 1, in this embodiment, the two-dimensional code 6 is printed on the fourth surface 4 of the second glass 20, and the black enamel paint is printed on the second surface 2 of the first glass 10 by conventional screen printing. Glass from the same batch has the same black enamel paint printed by screen printing.

In some embodiments, for different glass, different two-dimensional codes 6 are printed on the fourth surfaces 4 by ink-jet printing, also with black enamel paint. The ink-jet printer has a relatively low printing speed while a relatively high resolution ratio, and thus it can well realize high-precision two-dimensional code printing on a small area. Moreover, by printing the two-dimensional code with the enamel paint, the two-dimensional code can be permanently adhered and prevented from being worn or changed throughout the whole life of the vehicle. In particular, in this manner, the two-dimensional code can be scanned inside the vehicle and is not visible outside the vehicle, so that the position of the two-dimensional code is known only for the professional. Thus, the anti-counterfeiting verification function of the windshield is reliably realized and an aesthetic appearance of the windshield is also ensured.

In some embodiments, the black enamel paint may also be optionally printed on the fourth surface 4 of the second glass 20 by conventional screen printing. In these embodiments, the two-dimensional code 6 on the fourth surface 4 is visible or invisible relative to the exterior of the vehicle.

For an invisible two-dimensional code, for example, the black enamel paint is printed on both the second surface 2 and the fourth surface 4 or the black enamel paint is printed on the second surface 2, and the two-dimensional code may be printed on the fourth surface 4 with the black enamel paint which has different gloss from the black enamel paint on the second surface 2. For example, a lighter Ferro 14501 and a darker JM1T505 are respectively used.

For a visible two-dimensional code, for example, the black enamel paint is only printed on the fourth surface 4, and the two-dimensional code 6 on the fourth surface 4 may be printed with silver paste to obtain high contrast and a visual code. Thereby, the two-dimensional code on the fourth surface 4 can be obviously visible to the naked eyes inside the vehicle or outside the vehicle, and thus the information contained in the two-dimensional code can be scanned and identified by a two-dimensional code identification scanner.

For the embodiments in which the two-dimensional code 6 is printed on the fourth surface 4, the process for manufacturing the windshield may be performed by the following steps:

First, the first glass 10 and the second glass 20 which are cut and shaped shall be provided, and the first glass and the second glass are flat glasses at this moment.

Next, the black enamel paint is printed on the second surface 2 of the first glass 10 and/or the fourth surface 4 of the second glass 20 by screen printing. Here, the step of pre-sintering the second surface 2 and/or the fourth surface 4 which are printed with the black enamel paint is preferably included to facilitate solidifying the black enamel paint and improving performance and stability of the glass.

Then, the black enamel paint or the silver paste is printed on the fourth surface 4 of the second glass 20 by ink-jet printing to form the two-dimensional code 6.

Next, the first glass 10 and the second glass 20 are fed into a thermal-bending furnace and molded to have a required windshield curvature by high-temperature and high-pressure molding, and the two-dimensional code is sintered and solidified accordingly.

Finally, a sandwiching step is performed. A transparent adhesive intermediate film, such as PVB, is sandwiched between the first glass 10 and the second glass 20 which are thermal-bended and molded, such that two layers of the glasses are tightly adhered together to obtained a finished windshield. Here, it should be understood that the so-called "finished windshield" does not refer to a windshield that can be directly used. A conventional manufacturing process may further include subsequent steps, such as vacuuming for the glass interlayer and heating by a high temperature furnace and the like, so as to form a vehicle windshield having excellent performances, such as good thermal insulating performance, high transmittance and anti-explosion, etc.

When scanning and identifying from the exterior of the vehicle is needed, the two-dimensional code 6 may also be printed on the second surface 2 of the first glass 10 as in the embodiment shown in FIG. 2. Meanwhile, the black enamel paint is printed on the second surface 2 and/or the fourth surface 4 still by conventional screen printing to form a black printed border.

In some embodiments, the two-dimensional code 6 is printed onto the second surface 2 with the black enamel paint or the silver paste by ink-jet printing. In the embodiments in which the black enamel paint is adopted, the two-dimensional code may also be printed with an enamel paint having different gloss from the black enamel paint formed into the black printed border. Thus, the professional can identify the two-dimensional code by using an identification scanner outside the vehicle. Besides, since the two-dimensional code is formed inside the interlayer of the windshield, the two-dimensional code can not be removed or changed as long as the windshield remains intact, thus further improving the anti-counterfeiting function.

For the embodiments in which the two-dimensional code 6 is printed on the second surface 2, the process for manufacturing the windshield is substantially similar to the process for forming the two-dimensional code on the fourth surface 4 as described above, with the following differences:

After the black enamel paint is printed on the second surface 2 of the first glass 10 and/or the fourth surface 4 of the second glass 20 by screen printing, the second surface 2 and/or the fourth surface 4 may be pre-sintered. After that, the black enamel paint or the silver paste is printed on the sintered and solidified second surface 2 by ink-jet printing to form the two-dimensional code 6. Then, a thermal-bending molding process and a sandwiching process are performed on the first glass 10 and the second glass 20 to form a finished windshield.

By adopting the vehicle windshield with the two-dimensional code according to the present disclosure, the two-dimensional code including information about the glass and/or the vehicle can be prevented form being worn due to the scratching during daily use or being maliciously damaged, thereby ensuring the anti-counterfeiting function. Besides, various appearance effects and functions can be realized according to the actual requirements. For example, the two-dimensional code can be made visible or invisible to the naked eyes; the two-dimensional code can be scanned inside or outside the vehicle; and different glasses can have different two-dimensional codes. The colors or types of the enamel paint exemplified in the above embodiments are presented by way of example without limitation. Any other colors or types that can be implemented may be employed without departing from the spirit and scope of the present disclosure. In addition, it should also be understood that, although the two-dimensional code can be formed anywhere on the black printed border of the windshield, it is preferably formed at a corner of the glass to facilitate observation and scanning identification by the professional.

The technical content and technical features of the present disclosure have been disclosed above. However, it should be understood that those skilled in the art can make various variations and improvements to the above disclosed concepts under the inventive idea of the present disclosure, and all these variations and improvements belong to the scope of protection of the present disclosure. The description for the above embodiments is illustrative and not restrictive, and the scope of protection of the present disclosure is determined by the claims.

The invention claimed is:

1. A vehicle windshield with a two-dimensional code, the vehicle windshield comprising a first glass, a second glass and an intermediate film provided between the first glass and the second glass, wherein the first glass comprises a first surface facing the exterior of a vehicle and a second surface adhered to the intermediate film, while the second glass comprises a third surface adhered to the intermediate film and a fourth surface facing the interior of the vehicle; and wherein black enamel paint is printed on the second surface and/or the fourth surface; the second surface or the fourth surface is provided with a two-dimensional code printed with enamel paint at a position corresponding to the black enamel paint; and the two-dimensional code contains unique information of the glass and/or the vehicle.

2. The vehicle windshield according to claim 1, wherein the enamel paint comprises black enamel paint or silver paste.

3. The vehicle windshield according to claim 2, wherein the two-dimensional codes printed in different vehicle windshields are different.

4. The vehicle windshield according to claim 1, wherein the black enamel paint on the second surface and/or the fourth surface has different gloss from the enamel paint for printing the two-dimensional code.

5. The vehicle windshield according to claim 4, wherein the two-dimensional codes printed in different vehicle windshields are different.

6. The vehicle windshield according to claim 1, wherein the two-dimensional codes printed in different vehicle windshields are different.

7. A process for manufacturing a vehicle windshield with a two-dimensional code, the vehicle windshield comprising a first glass, a second glass and an intermediate film provided between the first glass and the second glass, wherein the first glass comprises a first surface facing the exterior of a vehicle and a second surface adhered to the intermediate film, while the second glass comprises a third surface adhered to the intermediate film and a fourth surface facing the interior of the vehicle, and wherein the process comprises the following steps:
- a. providing a first glass and a second glass which are cut and shaped;
- b. printing black enamel paint on the second surface and/or the fourth surface;
- c. printing a two-dimensional code with enamel paint on the second surface or the fourth surface at a position corresponding to the black enamel paint, the two-dimensional code contains unique information of the glass and/or the vehicle;
- d. molding the first glass and the second glass in a thermal-bending furnace; and
- e. sandwiching an intermediate film between the first glass and the second glass which are thermal-bended and molded to obtain a finished product.

8. The process according to claim 7, wherein the enamel paint comprises black enamel paint or silver paste.

9. The process according to claim 8, wherein the black enamel paint on the second surface and/or the fourth surface has different gloss from the enamel paint for printing the two-dimensional code.

10. The process according to claim 9, further comprising a step of pre-sintering the first glass and/or the second glass prior to the step d.

11. The process according to claim 8, further comprising a step of pre-sintering the first glass and/or the second glass prior to the step d.

12. The process according to claim 7, further comprising a step of pre-sintering the first glass and/or the second glass prior to the step d.

13. The process according to claim 12, wherein, in step c, different two-dimensional codes are printed for different vehicle windshields.

* * * * *